C. ELLIS.
PROCESS OF DESICCATING MILK.
APPLICATION FILED DEC. 16, 1909.
999,707.
Patented Aug. 1, 1911.
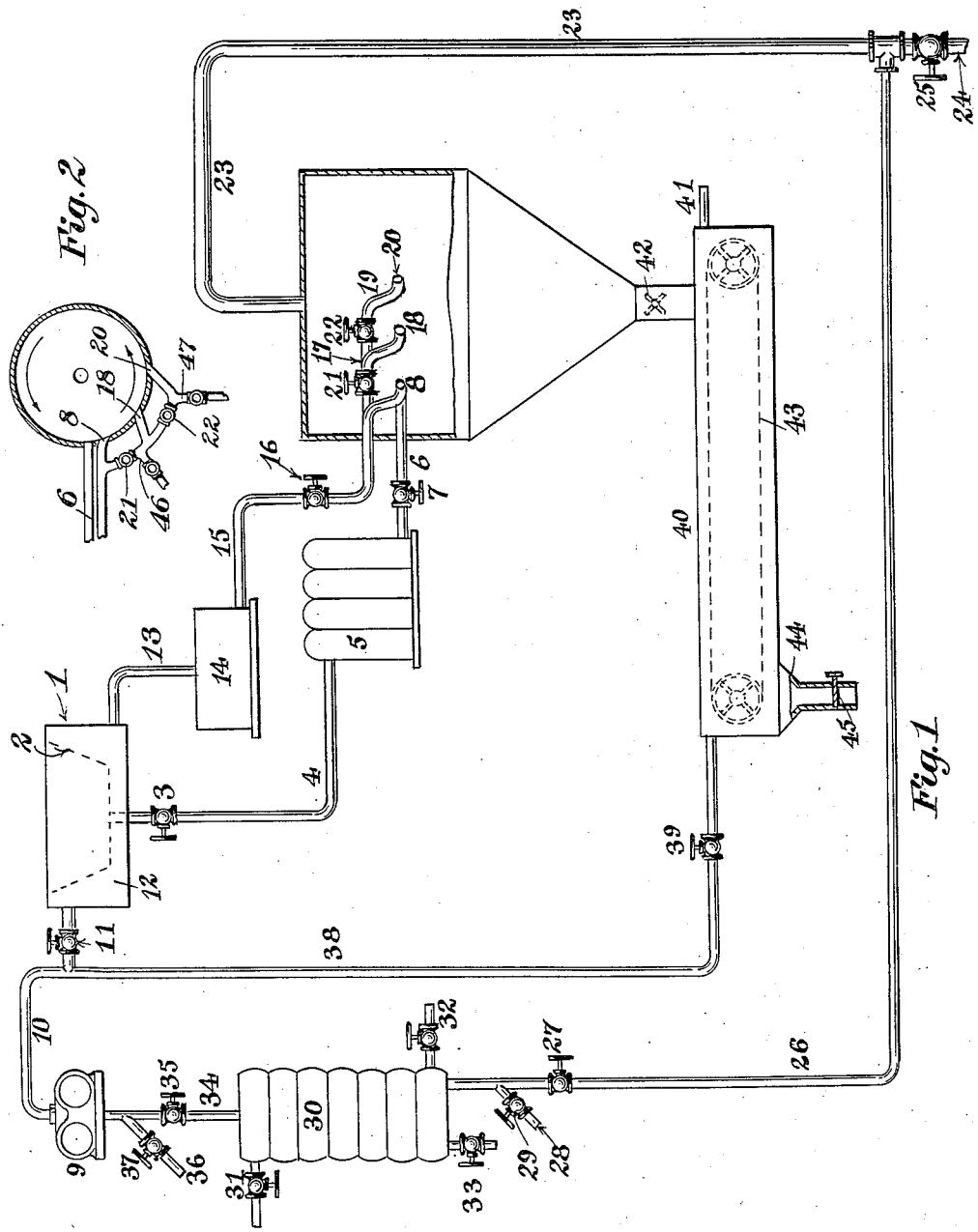

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF DESICCATING MILK.

999,707.  Specification of Letters Patent.  Patented Aug. 1, 1911.

Application filed December 16, 1909. Serial No. 533,475.

*To all whom it may concern:*

Be it known that I, CARLETON ELLIS, a citizen of the United States, residing at Montclair, in the county of Essex and State of New Jersey, have invented certain new and useful Improvements in Processes of Desiccating Milk, of which the following is a specification.

This invention relates to processes of desiccating milk, and relates particularly to a method involving the drying of milk by a jet of air preferably artificially dried.

In view of the impossibility of keeping milk for any substantial length of time without the use of preservatives, many efforts have been made to produce a dried milk which would retain all the characteristics of the original milk as regards solubility and assimilability, and which, being free from moisture, would retain its qualities for an indefinite length of time. Ordinary milk cannot be kept for more than a few days without the use of preservatives such as sodium benzoate, salicylate, borax, formaldehyde, and the like, all of which are more or less injurious to the human system if taken periodically in small quantities. The expense moreover, of keeping ordinary milk without the use of preservatives is very great. With certified milk, which is the only unmodified milk that is regarded as fairly safe to consume, so much care has to be devoted to the proper keeping of the milk that it becomes very expensive. Aboard steamships, for example, it is impossible to carry milk or cream except for very short voyages, without the use of preservatives.

Another very important consideration, especially in the neighborhood of large cities, is the great bulk or weight of fluid milk in comparison with its actual nutritive value. Ordinary milk carries only 10 to 12 per cent. of solid material, the balance being water. The cost of shipping milk in this form to meet the requirements of a large city, is very great, and the advantages of a dried milk, having, when dissolved in water, all the qualities of fresh milk, will be evident.

Prior efforts to produce a dried milk or milk product retaining the natural qualities of milk in a large measure, have been devoid of satisfactory results mainly because of the conduct of the processes involved at temperatures too high to allow of the proper desiccation of the milk without undergoing chemical changes. For example, in earlier processes, the temperatures were so high that the milk sugar, which is present to the extent of 4 or 5 per cent. in milk, and is in fact, the constituent present in largest amount, underwent changes of a caramelizing character, discoloring the milk and changing its flavor. Although the operations in many cases apparently were conducted at temperature seemingly below the caramelizing point, namely 215 degrees Fahrenheit, yet because of the action of the walls of the evaporating vessel which probably were superheated, the caramelizing action referred to often resulted. Furthermore, the various processes, which involved much agitation or treatment in vessels on drums and the like, caused the rupturing of the fat globules resulting in the agglomeration of the oil into masses which became rancid on exposure. The maintenance of the fat in its natural globular condition, is apparently essential to its preservation in dried form, for if the fat globules rupture and the fat particles coalesce, rancidity and change of flavor ensues on storage. Furthermore, the slow drying of milk accompanied by exposure to rather high temperatures and considerable mechanical treatment, results in an increase in the content of lactic acid, and as the milk concentrates, the proportionate amount of lactic acid very rapidly increases, resulting in an action on the casein which is highly detrimental. Under such conditions of high lactic acid content, casein in a very large measure loses its solubility and coagulates to form a product which is not readily digested. Various endeavors to neutralize the lactic acid by the addition of soda, lime, etc., in some measure overcomes this difficulty, but the soapy taste resulting in such instances from such neutralizing additions, makes their use objectionable. Furthermore, under the conditions of concentration as heretofore largely practiced, the albumin of the milk, which is a very important food element, is rendered insoluble and extremely difficult of digestion. This appears to be due to the joint action of lactic acid and heat, although sufficient heat alone, will of course, cause the coagulation of albumin without the presence of the acid. The albumin is even more susceptible of coagulation than the casein. It appears to be a complex mixture of albuminous material, extremely sensitive to the action of heat, and not always to be counted on as undergoing the same changes, when apparently desiccated under the same conditions. Most processes of drying milk, furthermore, are such as to render it necessary to leave in the milk from ½ to 3 or 4 per cent. of the moisture. On storage, deleterious changes may take place in the character of milk containing moisture of such amount. This is especially true in the warmer climates. More particularly, reactions involving the decomposition of the albumin are liable to occur.

It is the object of my invention to desiccate milk without caramelization of milk sugar or rupturing of the globules of fat, and with the processes conducted in such a manner that the lactic acid does not affect the solubility of the casein or albumin. For this purpose I concentrate ordinary milk in a vacuum pan, for example, until it is reduced to a fairly thick mass containing 40 to 60 per cent. of water or thereabout, and then atomize this milk with air, preferably well dried, so as to dry the atomized milk without contact with metallic surfaces during the latter stages of the drying. The first concentration in the vacuum pan may be carried on without great difficulty up to the degree of concentration referred to. Beyond that, coagulation of the casein and albumin is liable to occur, subsequently followed by caramelization of the milk sugar. Before this occurs, however, the milk is removed from the vacuum pan and subjected to the atomizing and desiccating action referred to. By the use of dry air, which may or may not be warmed, according to circumstances, a milk may be produced which has undergone no chemical change in drying and in which the lactic acid content is practically no higher relatively speaking, than that in normal milk; and furthermore, the particles of the dried milk are in such form as to be particularly soluble in water, so that by the mere addition to the dried milk of a suitable quantity of water, a fluid is immediately produced having the desirable characteristics of normal fresh milk. Under the conditions of operation, it is obvious that the product may be made comparatively free from all injurious bacteria, so that the fluid milk made from the desiccated product may be taken at any time without fear of contamination.

By reference to the accompanying diagrammatic drawings, it will be seen in what manner I carry out the process in its preferred embodiment; wherein—

Figure 1 shows a general plan of the apparatus with the evaporator shown in section, and Fig. 2 shows a section of the evaporator at a point where air jets enter it and also shows the means for the admission of cold air.

In Fig. 1, 1 is a double-bottom tank having the receptacle 2 containing fresh fluid milk. 3 is a valve in the pipe 4, connecting the receptacle 2 with the vacuum pan 5. This pan may be of the usual type of vacuum evaporator, preferably that known as the multiple effect. The pipe 6 leads from the vacuum pan to the rotary evaporator 8. This pipe 6 is supplied with the valve 7. 9 is a blower for supplying air under pressure. The outlet pipe 10 of this blower connects with the bottom section 12, of the pan 1, pipe 10 being fitted with the valve 11. The lower space or section of the pan 1, forms a jacket around the receptacle 2. An outlet pipe 13 leads from this lower space 12 to the heater 14. The pipe 15 leads from the heater 14 to the rotary evaporator. In this pipe is the valve 16. The outlets into the evaporator are 8, 18 and 20, and the two last named outlets are controlled by the valves 21 and 22. These outlets for the pipe 15 or inlets for evaporator 19, especially those at 18 and 20 are arranged to admit air more or less peripherally of the evaporator. This evaporator is shown of a cylindrical type, so that the auxiliary jets of air may be introduced tangentially, thereby causing the drying milk to travel in a circular or spiral path. An outlet pipe 23 leads from the evaporator 19, and at 24 is fitted with a discharge outlet controlled by the valve 25. The connecting pipe 26, controlled by the valve 27, leads to the refrigerating apparatus 30, having the inlet and outlet pipes 31 and 32, and water discharge pipe 33. An air inlet pipe 28 controlled by the valve 29 is placed in pipe 26 between the refrigerating apparatus 30 and the valve 27. From the refrigerating apparatus, a pipe 34 controlled by the valve 35, leads to the blower 9. In this pipe is situated the inlet pipe 36 controlled by the valve 37. In the lower part of the evaporator 19, is the discharge outlet 42, connected with the drying chamber 40, which carries the conveyer 43. The pipe 38 connecting through the pipe 10 with the blower 9 and valved at 39, enters the drying chamber 40, which is fitted with the outlet 41. 44 is a hopper and chute fitted with the gate 45.

In the operation of my process, fresh milk is placed in pan 2, and is allowed to discharge through the pipe 4 into the vacuum pan 5. From there it is taken to the evaporator 19, and enters the atomizer 8. Air which has passed through the refrigerating apparatus 30, is forced by the blower 9, around the pan 2, through the jacketed space 12, thereby cooling the contents of the pan 2, and preventing bacterial decomposition of the milk while in storage. From thence, the air passes through the heating device 14 and reaches the atomizer 8 in a warm or hot condition. It there meets with a stream of milk coming from the vacuum pan 5 and mingles with it, absorbing the moisture from the finely divided particles of milk, reducing them to a slightly plastic or somewhat pulverulent condition. This jet or current of air and finely divided milk travels peripherally along the walls of the evaporator 19 and would impinge upon the walls and there adhere or clog except for the action of the jets entering at 18 and 20, which discharging additional quantities of dry air, fend the current of dry milk from the walls of the evaporator and exert a desiccating action at a very moderate temperature, so that the milk is rapidly dried without subjecting it to temperatures resulting in decomposition from coagulation. The dried milk is withdrawn from the bottom of the evaporator, and if it contains more than 1 or 2 per cent. of moisture or thereabout is preferably allowed to traverse the drying chamber 40, along the conveyer 43, where it is subjected to cooled or dried air, or dry air at temperatures scarcely elevated above atmospheric. Inasmuch as it is in the latest stages of the drying of milk when the lactic acid content has increased in concentration to approximately the maximum, that the obscure changes most rapidly progress which render the casein and albumin insoluble, it is desirable to complete the drying at substantially atmospheric temperature by means of air from which the major portion of the normal moisture has been removed by refrigeration or otherwise. It is of course, feasible to shunt a portion of the heated air from the pipe 15 into the pipe 38, and thus, if desired, raise the temperature of the drying current in drying chamber 40, to a temperature slightly higher than normal atmospheric temperatures. It is possible by means of the heater 14, to maintain the temperature of the air passing from the pipe 15 into the evaporator at any desired temperature, and it may be entered through the inlet 8 at a rather elevated temperature, as at that point the milk carries the maximum amount of water. The air entering at 18 may be at a lower temperature, and that at 20 still further reduced and finally, preferably in the drying chamber, the air should be atmospheric temperature, or even less. In this manner, decomposition of the milk is prevented and a composition of natural solubility secured. The successive reduction in temperature of the air jets, at 8, 18 and 20 respectively may be secured by allowing the pipes to be unjacketed so that the radiation losses effect the cooling. Or this may be accomplished as shown in Fig. 2, where cold air is entered in regulated amounts by means of the cold air inlet pipes Nos. 46 and 47. Inasmuch as the air which passes repeatedly over the milk in the drying process, apparently becomes less capable of oxidizing the particles of milk, the apparatus is preferably arranged to carry the air or a portion of it in a cyclic path, leaving the evaporator, it may pass through the pipe 26, refrigerator, to be there divested of its moisture and sent through the evaporator or drying chamber, or both, at will. The inlet pipe 28 is provided so that mixtures of the cyclic air and ordinary air may be made; or, if desired, ordinary air alone employed. At 36, an air pipe is arranged to admit ordinary refrigerated or undried air when the conditions of operation warrant its use.

Since the process may be applied to the drying of malt extracts (alone or in conjunction with milk) and the like, it is desirable to have the apparatus sufficiently flexible to allow of operating with various materials under various conditions.

While the pan 2 surrounded by the cooling jacket 12 is not essential, it is a desirable element because of the ability to store large quantities of the milk and maintain at a low temperature without additional cost, as the air going from the blower 9, if refrigerated, serves to cool the milk and at the same time, the heating required in heating chamber 14, is not as great. If it be desired to introduce the air into the evaporator 19 at a very low temperature, the heating chamber 14 may be cut out and the air passed directly from the blower to the evaporator.

The whole operation is designed to be conducted in a continuous manner, in order to avoid the cost attendant on the handling of a product as bulky as milk by an intermittent method. By conducting the operation in this continuous manner, the cost to manufacture is greatly reduced, as the milk requires no handling beyond its introduction into the storage tank 2 and the packaging of the dry milk at the chute 44.

In the drying of milk, it is desirable to reduce the temperature successively during the operation of drying, and my process is so conducted that the milk entering the evaporator may be subjected to a lower and lower temperature so that it is successively reduced in temperature with each successive increment in the content of the lactic acid, by which method, in conjunction with the continuous process of handling the product, a desiccated milk is secured which is entirely free from the objectionable features of those heretofore prepared by those processes which fail to take cognizance of the chemical deteriorations and change in flavor taking place in milk when dried at higher temperatures over longer periods or in contact with the walls of the drying receptacle and subjected to considerable mechanical agitation when in such contact.

Having described my invention to the details of which, I do not wish to limit myself, what I claim is:—

1. The process of desiccating milk which consists in partially concentrating milk under reduced atmospheric pressure, in mingling said partially concentrated milk with a jet of artificially dried and warmed air under pressure, whereby a current of air carrying subdivided particles of milk undergoing desiccation, is produced and in introducing into said current, successive jets of air to substantially complete the drying of said milk particles.

2. The process of desiccating milk which consists in partially concentrating milk under diminished atmospheric pressure, in mingling said partially concentrated milk with a pressure jet of dried and heated air to produce a current in which the particles of milk undergoing desiccation are therein suspended, and in successively introducing into said current, jets of air at successively lower temperatures to produce a pulverulent milk product substantially free from moisture, said jets of air being introduced at such temperatures that the drying of the milk is conducted at successively lower temperatures proportionate to the increase in concentration of the lactic acid content of the milk particles.

3. The process of desiccating milk which consists in subjecting milk to partial concentration under diminished pressure, in mingling said partially concentrated milk with artificially dried and heated air under pressure, in separating said milk when substantially dry from said air, in passing over the substantially dried product, a current of artificially dried cold air to remove the last traces of moisture and in collecting the resulting dried product.

4. The process of desiccating milk which consists in subjecting fresh milk to partial concentration under diminished pressure, mingling said partially concentrated milk with dried and heated air, under atomizing conditions, in allowing said air to act upon said milk until the moisture is substantially removed, in passing a current of cold artificially dried air over the resulting dried milk to remove the last traces of moisture and in removing a portion of the air used for drying said milk, refrigerating said air to remove the moisture thereof, and in mingling said air with additional quantities of partially concentrated milk.

5. The process of desiccating milk, which consists in partially concentrating fresh milk under diminished admospheric pressure, mingling said partially concentrated milk with a jet of heated air to form a stream of drying milk suspended in a current of air, in causing said stream to travel in a spiral path, in successively introducing into said stream a plurality of air jets and in collecting the milk in a pulverulent condition, substantially free from moisture.

In testimony whereof I have affixed my signature in presence of two witnesses.

·CARLETON ELLIS.

Witnesses:
NATHANIEL L. FOSTER,
JAMES B. ELLOTT.